UNITED STATES PATENT OFFICE.

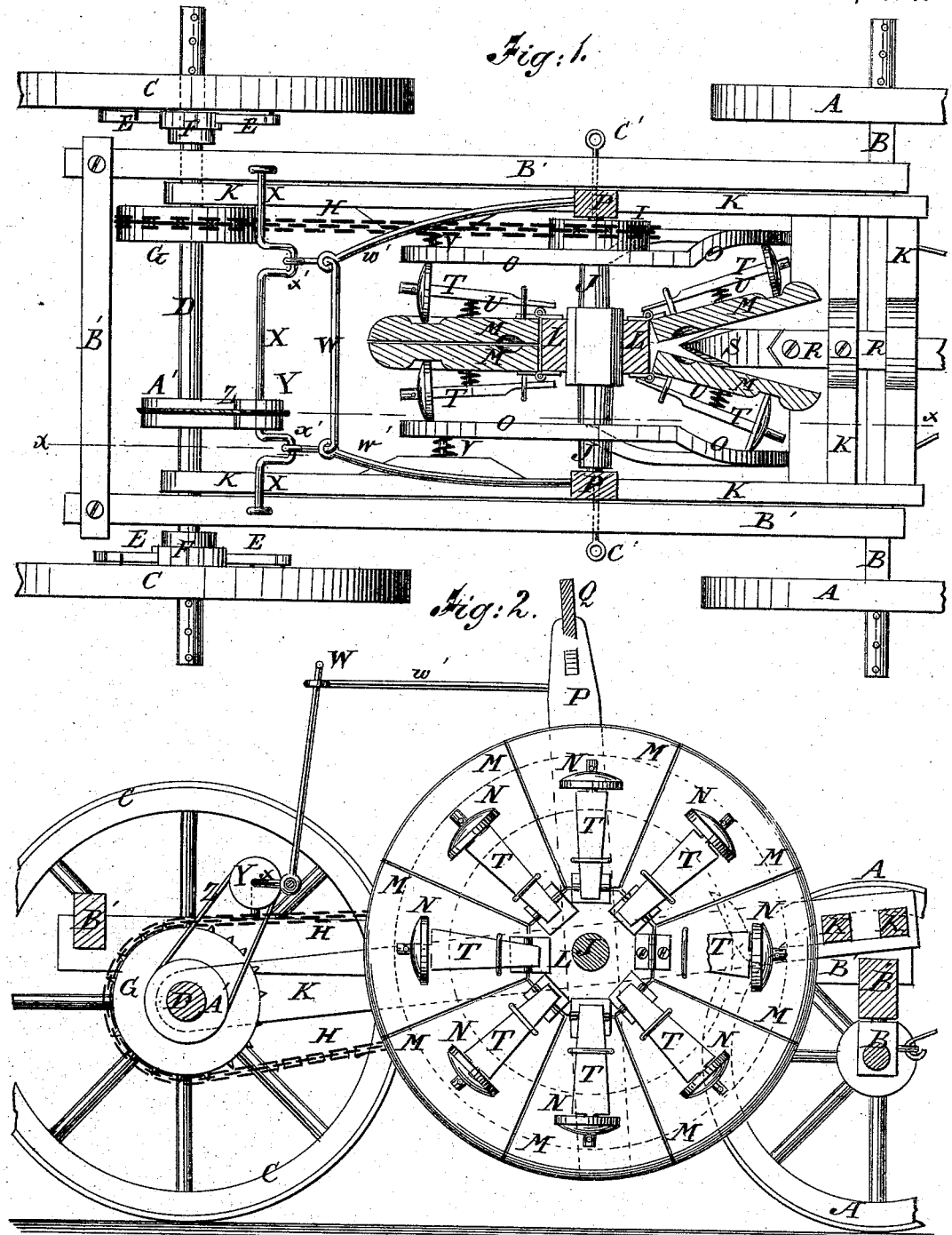

JOHN S. SWANEY, OF MARENGO, IOWA.

IMPROVEMENT IN SEEDLINGS-PULLERS.

Specification forming part of Letters Patent No. 156,744, dated November 10, 1874; application filed June 27, 1874.

*To all whom it may concern:*

Be it known that I, JOHN S. SWANEY, of Marengo, in the county of Iowa and State of Iowa, have invented a new and useful Improvement in Seedlings-Puller, of which the following is a specification:

Figure 1 is a top view of my improved machine, partly in section, to show the construction. Fig. 2 is a vertical longitudinal section of the same, taken through the line $x\ x$, Fig. 1. Fig. 3 is a detail view, showing the arrangement for adjusting the height of the pulling-wheel above the ground.

Similar letters of reference indicate corresponding parts.

The invention will first be fully described, and then pointed out in the claims.

A are the forward wheels, which revolve upon the journals of the axle B. C are the rear wheels, which revolve upon the journals of the axle D. The journals of the axles B D are made long, and have several holes formed in them to receive the linchpins, so that the wheels may be adjusted wider apart or closer together, as the distance apart of the rows of seedlings to be pulled may require, the wheels being kept in place when moved outward by washers or collars placed upon the inner end of the said journals, and secured by set-screws. To the rear wheels C are secured spring-pawls E, the engaging ends of which take hold of the teeth of the ratchet-wheels F placed upon the inner ends of the journals of the axle D, and secured in place by set-screws, so that the said wheels C may carry the said axle D with them in their forward revolutions, but may roll backward without turning the said axle. The axle D revolves in bearings attached to the rear part of the side bars of the frame B' to the center of the front cross-bar of which frame the front axle B is pivoted by a king-bolt. To the axle D is rigidly attached a large chain-wheel, G, around which passes an endless chain, H, which also passes around a small chain-wheel, I, attached to the shaft J, so that the said shaft J may be revolved rapidly by the slow revolution of the axle D. Two sets of the wheels and chain G H I should be used, one set being connected with each end of the shaft J. The journals of the shaft J revolve in bearings in the side bars of the frame K. The rear ends of the side bars of the frame K are slotted to receive and ride upon the axle D. The frame K fits between the side bars of the frame B', so that it may be held against lateral movement by said frame B'. To the center of the shaft J is attached a polygonal hub, L, having eight, more or less, sides. To the outer edges of the sides or faces of the polygonal hub L are hinged an equal number of pairs of sectors or jaws, M, which together form a double wheel, as shown in Figs. 1 and 2. The sectors or jaws of each pair are pressed toward each other by small wheels N, which bear against their outer sides, and roll along ring-shaped tracks, guides, or cams O, which are attached to uprights P, which are secured to the middle parts of the side bars of the frame K, and the upper ends of which are connected and held in position by a cross-bar, Q. To the front cross-bars of the frame K is attached a rearwardly-projecting bar, R, to the rear end of which is attached a wedge-shaped block, S, the pointed end of which, as the shaft J revolves, enters between the sectors or jaws of each pair. The sectors M and wheels N are allowed to move outward by outward curves formed in the forward part of the ways O, as shown in Fig. 1. The wheels N revolve upon standards T, the lower ends of which are inserted in keepers attached to the inner parts of the sectors M. The sectors or jaws M are pressed toward each other by springs U interposed between them and the standard T, and which allow said sectors to yield to adjust themselves to the thickness of the plants grasped by them. V are springs interposed between the ways O and their supports, to allow the jaws or sectors M to yield still further to adjust themselves to the thickness of the plants grasped by them. The springs U and V must be of such a strength as to force the jaws M toward each other with such force that they will grasp the plants with sufficient firmness to draw their roots from the ground. The faces of the jaws or sectors M should be lined or cushioned with leather or other suitable material, to prevent them from crushing or injuring the plants grasped by them.

With this construction, as the machine is drawn forward, the jaws or sectors M will be opened to allow the plants to pass between them, and will then grasp the said plants and draw their roots from the ground. As the jaws are again opened by the opener S, the plants will drop into a concavity formed in the cross-bars of the frame K, or into a trough or receiver attached to said frame, whence they are taken by an attendant and bound, and the bundles thrown upon the ground, or they may be thrown upon the ground in loose bunches. As the plants pass up at the rear side of the wheel J L M they are struck by the horizontal rod W, the ends of which are bent downward, pass through guides $w'$ attached to the bars P, and are pivoted to the cranks $X'$ formed upon the shaft X. The shaft X revolves in bearings attached to the frame that connects the front and rear axles of the carriage, and to it is attached a small pulley, Y, around which passes an endless band, Z, which also passes around a larger pulley, $A'$, attached to the axle D, so that the rod W may receive a rapid up-and-down movement from the advance of the machine. The rod W should have a tubular roller covered with rubber or other suitable material placed upon it, to prevent it from injuring the plants by striking them.

By this device all the soil will be knocked off the roots of the plants before they are dropped into the receiver.

The forward end of the frame K can be raised or lowered to adjust the pulling-wheel J L M at the proper distance above the surface of the ground, and is held in position, when adjusted, by pins $C'$, which pass through holes in the side bars of the frame $B'$ and enter holes in the side bars of the frame K, or in the uprights P attached to the said frame K, as shown in Fig. 3.

Having thus described my invention, I claim as new and desire to secure by Letters Patent—

1. The combination of rolls N, jaws M, and cams K, with pivoted arms T and springs U V, as and for the purpose described.

2. The combination, with the revolving puller-wheel, of the dirt-cleaner W, operated substantially as shown and described.

JOHN S. SWANEY.

Witnesses:
J. Q. A. HUTTON,
J. B. WILSON.